Sept. 11, 1956    K. T. PARSELL    2,762,500
HOLDER FOR CLEANING AND PROTECTING SPECTACLES
Filed Sept. 7, 1954
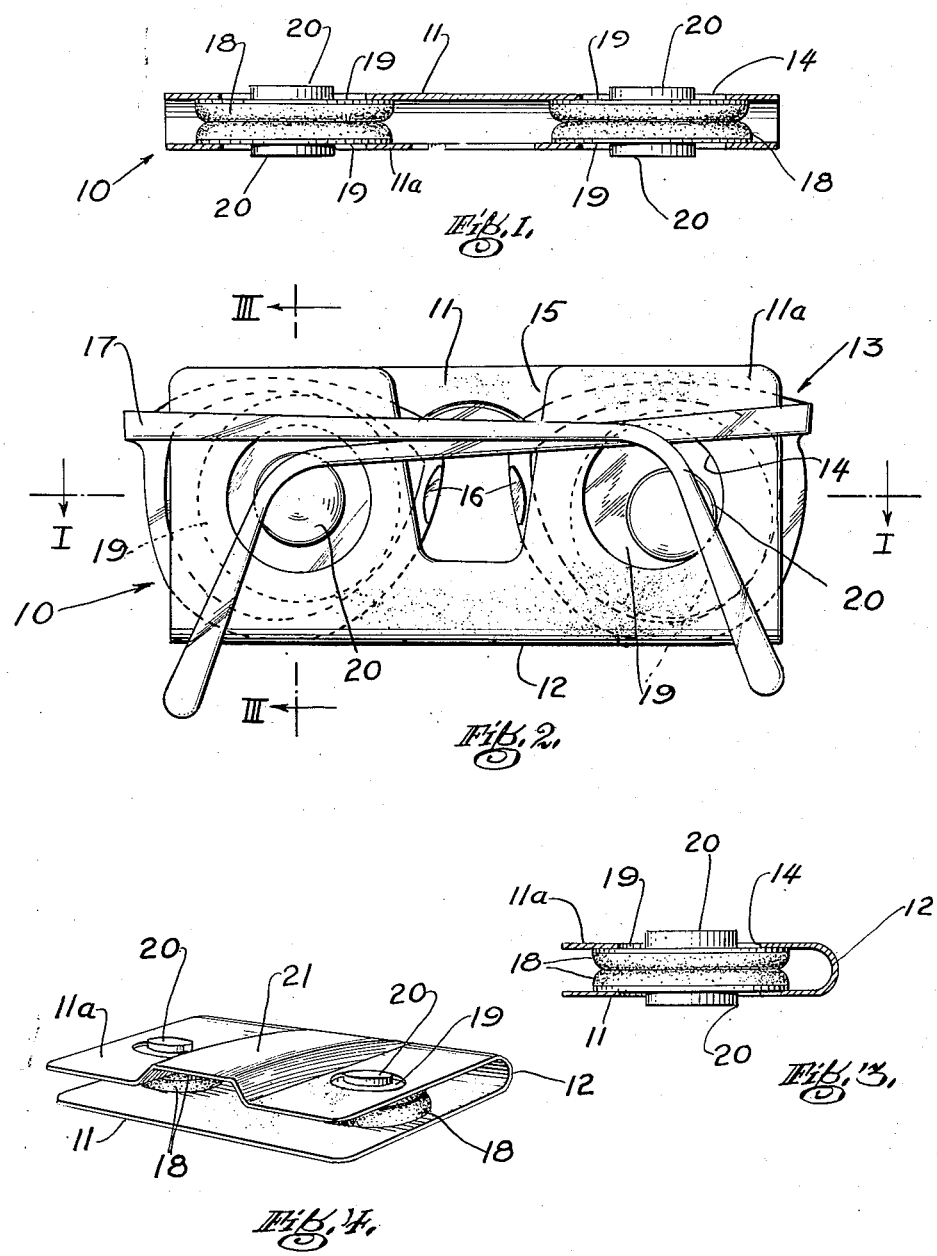
INVENTOR
Kendrick T. Parsell
BY Kenyon & Kenyon
ATTORNEYS

United States Patent Office 2,762,500
Patented Sept. 11, 1956

2,762,500

HOLDER FOR CLEANING AND PROTECTING SPECTACLES

Kendrick T. Parsell, Manhasset, N. Y.

Application September 7, 1954, Serial No. 454,250

3 Claims. (Cl. 206—5)

This invention relates to a holder for spectacles.

It is an object of this invention to provide a holder for spectacles which comprises means whereby the lenses mounted in a spectacle frame may be cleaned and which affords protection for spectacles so that spectacles may be carried therein without substantial danger of injury or breakage.

Conventional spectacle cases merely provide a container in which spectacles may be inserted when not in use. As so contained the lenses of the spectacles are apt to accumulate dust or lint and may otherwise have become soiled so as to require cleaning of the lenses when the spectacles are to be used again. Usually this cleaning is accomplished by use of a handkerchief or a special cleaning paper prepared for the purpose. However, such cleaning when the spectacles are to be used again is a nuisance and frequently there is no suitable cleaning material available for the purpose.

There have been certain proposals for providing spectacle cases equipped with means for cleaning the lenses of spectacles carried therein. Some such proposals involve the employment of soft flexible cases whereby, by manipulation of the flexible material of the spectacle case from the outside, one can rub cleaning material against the lenses so as to accomplish a certain amount of cleaning. However, any such spectacle case, to be of utility in permitting cleaning of the spectacles' lenses, inherently is flimsy and does not provide good protection for the spectacles. Spectacle cases are frequently carried in the pocket and when a spectacle case is of such flimsy construction breakage of the spectacles is very likely to occur due to pressure against the spectacle case as, for example, the result of sitting on the spectacle case or leaning against an object.

Spectacle cases which are of greater strength and rigidity have been proposed which are equipped with means for cleaning the spectacle lenses, but the arrangements proposed have been both clumsy and of such intricacy of construction as to render them impractical either for use or for commercial manufacture and sale.

Accordingly it is a further object of this invention to provide a holder for spectacles which is of rigid or semi-rigid construction for affording highly effective protection for spectacles contained therein and at the same time to provide simple but highly effective means for cleaning the lenses of spectacles carried within the holder. A still further objective of this invention is to provide a holder of the character aforesaid which is extremely simple and economical to manufacture and which is very convenient to use.

For obtaining the foregoing objects and advantages, features of this invention relate to the provision of a protective envelope member in combination with manually actuatable lens cleaning elements as described and exemplified hereinbelow in connection with the accompanying drawings, wherein:

Fig. 1 is a side elevational view of a spectacle holder embodying this invention with the envelope portion thereof shown in section along the line I—I of Fig. 2;

Fig. 2 is a plan view of the spectacle holder shown in Fig. 1 that also shows the position of spectacles inserted so as to be held therein and carried thereby;

Fig. 3 is an end view of the spectacle holder shown in Figs. 1 and 2, taken along the line III—III of Fig. 2; and Fig. 4 is a perspective view of an alternative embodiment of this invention.

Referring to the embodiment of this invention shown in Figs. 1, 2 and 3, the principal element of the holder is the envelope which is indicated generally by the reference character 10 and which comprises the bottom and top lens protecting members 11 and 11a respectively. Because Fig. 1 shows the holder turned 90° about the line I—I of Fig. 2, the top lens protecting member 11a appears underneath the lens protecting member 11. The lens protecting members 11 and 11a are joined together along the closed marginal portion 12 of the holder. The opposite margin of the holder is open for permitting the reception of a spectacle frame between the bottom and top lens protecting members 11 and 11a so that a spectacle frame such as that indicated generally by the reference character 13 in Fig. 2 may assume the position shown in Fig. 2.

In preferred construction the closed marginal portion 12 is an integral part of sheet material which also is comprised in the top and bottom lens protecting members 11 and 11a and which is curved along the margin 12 so that the top and bottom lens protecting members 11 and 11a will be in opposed spaced relation substantially as shown in the drawings. The sheet material that is used is one that affords substantial and effective resistance to deformation and which provides strength appropriate for protecting the lenses and lens frames of spectacles and maintains the lens protecting members 11 and 11a in the spaced apart position shown. It is preferable that the sheet material have at least some resilient flexibility so as to facilitate the insertion and removal of the lens cleaning elements as described more in detail hereinbelow.

Each of the lens protecting members 11 and 11a has two openings therein which are disposed as regards spacing from each other and from the margins of the holder so as to correspond at least approximately with the location of lens elements mounted in a spectacle frame that has been received between the lens protecting members 11 and 11a of the envelope 10. Each of these openings is indicated by the reference character 14.

At least one of the lens protecting members 11 and 11a has the recess 15 therein (in the embodiment shown it is in the member 11a) for accommodation of the nose rest portion 16 of the spectacle frame when the spectacle frame is inserted in the envelope member. Preferably the longitudinal extent of at least the lens protecting member 11a is approximately the same as the normal spacing of the inner surfaces of the temples 17 where they are hingedly attached adjacent the ends of the spectacle frame, thus permitting the temples to be folded over the upper or outer surface of the lens protecting member 11a as shown in Fig. 2. It may also be noted that when the spectacle frame is thus inserted in the envelope it is prevented from substantial longitudinal movement relative to the envelope.

At each of the openings 14 there is a lens cleaning element, each of which is similar to the others. Each of the lens cleaning elements comprises the pad 18 which faces inwardly and is adapted to contact a lens mounted in a spectacle frame that has been inserted in the envelope member. This pad is adapted to clean the lens with which it is in contact and likewise provides a soft resilient holding means for holding the spectacles without injury and may be composed of any suitable material such as a soft or pile fabric, felted fibers, etc., and may be chemically treated, if desired, with known materials such as those that have heretofore been used for application to paper, fabric and the like intended for cleaning lenses. The pad 18 is secured to the stiffening backing sheet 19 as by an adhesive. The stiffening backing sheet 19 has substantially greater lateral extent than the opening 14 so that the lens cleaning element may be laterally moved substantially relative to the opening 14 without entering it or passing therethrough. The stiffening backing sheet 19 possesses substantial stiffness so as to hold the pad 18 throughout its extent notwithstanding the fact that the backing sheet 19 is held only along the margins thereof so as to maintain the pad 18 in contact with a lens mounted in a spectacle frame inserted within the holder. The stiffening backing sheet 19 may be composed of the same sheet material used for the envelope 10.

Projecting from the backing sheet 19 and secured thereto is the finger-piece 20 which has substantially less lateral extent than the opening 14. The finger-piece 20 may be a separate piece that is secured to the backing sheet 19 or may be made integral therewith. Thus the finger-piece 20 is such as to permit substantial movement of the cleaning element relative to the envelope while at the same time the extent of such movement is limited by the size of the opening 14 and the cleaning element is prevented from accidentally falling out of the envelope. Moreover, the finger-piece 20 serves the important function of providing convenient means whereby the cleaning element may be manipulated by the fingers for movement relative to the envelope and likewise relative to the lens that is in contact with the pad 18 when a spectacle frame has been inserted within the envelope. The terminal exposed surface of the finger-piece 20 preferably is cupped, e. g., concave, so as to facilitate manipulation for effecting lateral movement of the cleaning element.

The holder of this invention is very simple and economical to manufacture. Thus the envelope can be made from a single sheet of suitable material such as metal or plastic which is bent to provide the margin 12 and which has the openings 14 and the recess 15 stamped therefrom. The holder can be assembled very simply for all that is required is to insert the cleaning elements between the top and bottom lens protecting members 11 and 11a until the finger-piece 20 of each of the lens cleaning elements comes, respectively, within one of the openings 14. The resilient compressibility of the pad portion 18 of the cleaning elements permits such assembly. Likewise, as aforesaid, the sheet material of the envelope preferably possesses substantial resilient flexibility so that the top and bottom lens protecting members may have the spacing therebetween increased somewhat for facilitating the insertion and removal of the lens cleaning elements. It is noteworthy that there are no parts which have to be secured together by mechanical securing means.

The utility of the holder of this invention is believed to be apparent from the foregoing description. After the parts of the holder have been assembled to the position shown in Figs. 1 to 3 a spectacle frame may be inserted from the open margin of the holder until the spectacle frame assumes the position shown in Fig. 2, the temples thereupon being folded over lens protecting element 11a as shown. When in this position the spectacles can be conveniently carried in the holder and effective protection is afforded by reason of the stiffness of the lens protecting members 11 and 11a of the envelope 10 and by virtue of the softness of the pad 18 which comes in contact with each of the lenses and the frames in which the lenses are mounted. Merely by the act of inserting and removing the spectacle frame the lenses are to a substantial extent cleaned. However, so as to cover all parts of the lenses and subject them to wiping to remove film and dust from the lenses, the lens cleaning elements may be readily moved about by use of the finger-pieces 20 which may be readily grasped between the thumb and fingers. Since the spectacle frame is held so that it does not move substantially relative to the envelope member in which the frame has been inserted, the manual movement of the cleaning elements 20 serves to effectively clean the lenses of the spectacles with a wiping or rubbing action that is very similar to that which occurs when the lenses of the spectacles are cleaned by rubbing them between the folds of a handkerchief, the amount of pressure being directly responsive as desired to the amount of manual pressure exerted by the user.

After the spectacles have been removed the cleaning faces of the pads 18 tend to move toward each other so that each provides an effective cover for the other, thereby preventing access of dust and dirt which otherwise might adversely affect the cleaning surfaces.

After the holder has been used for some time it may be desirable to replace or clean one or more of the cleaning elements; and in such case the removal and reinsertion of a cleaning element is very simply and easily accomplished. As aforesaid, all of the cleaning elements preferably are alike and they can be made up separately for replacement in holders previously sold.

Referring to Fig. 4, the structure is essentially that shown in Figs. 1 to 3 and the structural elements have been indicated by like reference characters. The only respect by which the embodiment of Fig. 4 differs from that shown in Figs. 1 to 3 resides in the fact that instead of having the recess 15 in the lens protecting member 11a, an outwardly extending bridging portion 21 is provided which provides protection for the nose rest portion of the spectacle frame by acting as a protective cover therefor.

I claim:

1. A holder for spectacles which comprises a protective envelope comprising lens protecting members maintained in opposed spaced apart relation by a closed marginal portion, the opposite margin being open for receiving a spectacle frame between said lens protecting members and each of said lens protecting members having two openings therein positioned in correspondence with the location of the lenses mounted in a spectacle frame received between said lens protecting members and at least one of said lens protecting members being shaped to accommodate the nose piece of a spectacle frame when received between said members, and a lens cleaning element disposed at each of said openings, each of said lens cleaning elements comprising an inwardly facing pad adapted to contact one of the surfaces of one of the lenses mounted in a spectacle frame received between said lens protecting members, a stiffening backing sheet which is secured to the back of said pad and has a substantially greater lateral extent than the opening at which said lens cleaning element is disposed for permitting substantial movement of said lens cleaning element laterally with respect to said opening without entering the opening, and a finger piece which is secured to said backing sheet and extends through said opening and which has substantially lesser lateral extent than said opening for permitting substantial lateral movements within the limits permitted by said opening of said cleaning element relative to a lens mounted in a spectacle frame received between said lens protecting members of said envelope.

2. A holder for spectacles which comprises a protective envelope composed of deformation-resistant, resiliently flexible sheet material, said envelope comprising two lens protecting members disposed in substantially spaced parallel relation and a curved connecting portion extending along one longitudinal margin of said envelope integrally with said lens protecting members, the opposite margin of said envelope being open for receiving a spectacle frame between said lens protecting members, at least one of said lens protecting members being shaped to accommodate the nose piece of a spectacle frame received between said members and being shorter than a spectacle frame received between said members for permitting the folding of temples hingedly secured adjacent the ends of a so-received spectacle frame over said member while preventing substantial longitudinal movement of a so-received spectacle frame relative to said envelope and each of said lens protecting members having two openings therein positioned in accordance with the lenses mounted in a spectacle frame received between said members, and a lens cleaning element disposed at each of said openings, each of said lens cleaning elements comprising an inwardly facing pad adapted to contact one of the surfaces of one of the lenses mounted in a spectacle frame received between said members, a stiffening backing sheet secured to the back of said pad adapted to be laterally slid in contact with the inner surface of the lens protecting member adjacent the opening at which said lens cleaning element is disposed, and a finger piece which is secured to said backing sheet, which presents a terminal exposed surface approximately flush with the outer surface of said member and adapted to be engaged by thumb or finger for effective lateral movement of said element relative to said opening and which is smaller than said opening for permitting substantial lateral movement of said lens cleaning element within limits permitted by said opening and relative to said opening and to a lens mounted in a spectacle frame received between said lens protecting members of said envelope.

3. A holder for spectacles which comprises an envelope having deformation-resistant lens protecting members and means for holding said members in spaced apart relation leaving a longitudinal margin of said envelope open for receiving spectacles with the spectacle frame between said members and with the temples folded over the outer surface of one of said members, lens cleaning pad means which are disposed between said members and present lens cleaning surfaces facing the lenses mounted in a spectacle frame received between said members and which are laterally movable relative to said members, and manually engageable finger pieces secured to said pad means and extending through openings comprised in said members in laterally movable relation therewith for moving said pad means laterally relative to said members and relative to the surfaces in contact therewith of lenses mounted in a spectacle frame received between said members.

References Cited in the file of this patent

UNITED STATES PATENTS

| | | |
|---|---|---|
| 686,657 | James | Nov. 12, 1901 |
| 794,603 | Fulgham | July 11, 1905 |
| 1,277,210 | Goelkel et al. | Aug. 27, 1918 |
| 2,461,792 | Weaver | Feb. 15, 1949 |
| 2,650,701 | Parsell | Sept. 1, 1953 |